US012801106B2

(12) United States Patent
Ruggieri

(10) Patent No.: US 12,801,106 B2
(45) Date of Patent: Nov. 17, 2026

(54) METHOD FOR OPERATING AN AXIS SYSTEM, AND AXIS SYSTEM

(71) Applicant: SCHUNK Electronic Solutions GmbH, St. Georgen (DE)

(72) Inventor: Patrick Ruggieri, Trossingen (DE)

(73) Assignee: SCHUNK ELECTRONIC SOLUTIONS GMBH, St. Georgen (DE)

( * ) Notice: Subject to any disclaimer, the term of this patent is extended or adjusted under 35 U.S.C. 154(b) by 326 days.

(21) Appl. No.: 18/504,689

(22) Filed: Nov. 8, 2023

(65) Prior Publication Data

US 2024/0168446 A1 May 23, 2024

(30) Foreign Application Priority Data

Nov. 18, 2022 (DE) ..................... 10 2022 130 530.9

(51) Int. Cl.
*G05B 19/04* (2006.01)
*B23Q 15/12* (2006.01)

(52) U.S. Cl.
CPC ........... *G05B 19/041* (2013.01); *B23Q 15/12* (2013.01)

(58) Field of Classification Search
CPC .. G05B 19/041; G05B 19/404; G05B 19/416; G05B 2219/43062; G05B 2219/43106;
(Continued)

(56) References Cited

U.S. PATENT DOCUMENTS 8,548,701 B2 * 10/2013 Tsukamoto ............. F16H 59/72 701/60
10,103,678 B2 * 10/2018 Hambloch ........... B62D 5/0496
(Continued)

FOREIGN PATENT DOCUMENTS

DE 34 43 276 A1 6/1985
DE 10 2005 050 741 A1 4/2007
(Continued)

OTHER PUBLICATIONS

German Examination Report for application No. 10 2022 130 530.9 dated Jul. 21, 2023 with English translation, 16 pages.

*Primary Examiner* — Zhipeng Wang
(74) *Attorney, Agent, or Firm* — Carter, DeLuca & Farrell, LLP

(57) ABSTRACT

An axis system for a blank separator includes at least one axis, at least one actuating element movable linearly along the at least one axis, at least one electric drive for moving the at least one actuating element, a drive controller, and at least one temperature sensor. During operation, the actuating element has an operating speed and/or an operating acceleration, and the electric drive and/or the axis has an operating temperature. The drive controller includes a memory storing a maximum permissible limit temperature of the electric drive and/or the axis. The drive controller determines a maximum permissible limit speed and/or limit acceleration of the actuating element as a function of the maximum permissible limit temperature and the operating temperature detected by the temperature sensor. The drive controller adjusts the operating speed and/or the operating acceleration of the actuating element as a function of the maximum permissible limit speed and/or the maximum permissible limit acceleration.

14 Claims, 3 Drawing Sheets

(58) Field of Classification Search
CPC ...... G05B 2219/43203; G05B 19/4142; G05B 2219/34013; B23Q 15/12
See application file for complete search history.

(56) References Cited

U.S. PATENT DOCUMENTS

| | | | | |
|---|---|---|---|---|
| 2006/0155452 | A1* | 7/2006 | Strenkert | B60W 10/04 701/65 |
| 2010/0087997 | A1* | 4/2010 | Tsukamoto | F16H 59/72 701/60 |

FOREIGN PATENT DOCUMENTS

| | | | |
|---|---|---|---|
| DE | 10 2012 011 378 | A1 | 12/2013 |
| DE | 10 2020 211 422 | A1 | 3/2022 |
| EP | 2952991 | A1 | 12/2015 |

* cited by examiner

METHOD FOR OPERATING AN AXIS SYSTEM, AND AXIS SYSTEM

The invention relates to a method for operating an axle system, and to an axle system, preferably for a clamping device, for a gripping device, for a robot, or for a blank separator. The axle system comprises at least one axle and at least one actuating element that can be moved into different positions along the at least one axle. The actuating element can be designed as a carriage, gripping element, clamping element, or tool (holder). Furthermore, the axle system comprises at least one electric drive, in particular a direct drive, for moving the actuating element. During operation, the actuating element has an operating speed and/or an operating acceleration in each of its positions, and the electric drive and/or the axle has/have an operating temperature.

The blank separator can be used in the production of printed circuit boards; blank separators separate individual printed circuit boards from a larger composite—a printed circuit board panel. During separation, it is necessary to grip the printed circuit board, and to handle it after its complete separation by means of a corresponding gripping device. It is conceivable that the actuating element is designed as such a gripping device and that the handling takes place along the axle.

It is desirable to operate an axle system at the power optimum so that a high operating speed can be achieved with high operational reliability and with high longevity. In the ideal case, all future intended uses of the axle system are known, along with all ambient conditions, such that a single, individual and optimal set of operating parameters can be generated during the upstream design step for each purpose. In order to design the cycle time of an axle system, the mechanical components are designed with regard to vibration behavior, strength and/or fatigue strength, and the drive is designed with regard to the maximum force/maximum speed and/or the thermal loads, wherein the thermal load of an axle system is determined inter alia by the ambient temperature, the thermal coupling, the moving variable mass (drag chain, tool holder, workpiece receptacle, etc.), the cooling by movement, the type of movement (multi-axis, linear/rotational) and the cooling when stationary (tool change, sequential movement sequence of a plurality of axles, etc.).

With increasing operating time, and/or with increasing speed and/or acceleration and/or jerking of the actuating element, the operating temperature of the electric drive and/or of the at least one axle also increases. In the worst case, the operation of the axle system at or above the thermal load limit can lead to total failure of the axle system. Accordingly, in the prior art, design is absolutely necessary; in particular for optimal use, extensive design is required. However, this is often not possible in practice, since the intended uses and the ambient conditions are not known, and the comprehensive individual design for each intended purpose, in particular due to the complexity of the intended use, is very complex. This has the result that the operating parameters are not optimally designed for the particular individual intended use; rather, they only represent an average over a plurality of intended uses. A considerable safety margin before the power limit is often provided in order to achieve the desired operational reliability and longevity considering the worst-case scenario. It follows from this that many axle systems are not operated at the potential power optimum, and are thus slower than what is possible.

DE 10 2020 211 422 A1 discloses a method for operating a drive train of a drive unit, wherein the power consumption of the working motor is limited in accordance with the temperature and the temperature gradient. DE 10 2012 011 378 A1 discloses a method for controlling a machine with a first drive and a second drive, wherein one of the two drives is operated at a low power if a power peak is to be avoided when the two drives are operated simultaneously. DE 10 2005 050 741 A1 discloses a method for operating an electric motor with a temperature-controlled reduction in power on the drive side.

The object achieved by the invention is accordingly that of providing a method for operating an axle system, wherein the axle system can always be operated at the power optimum, simultaneously with high operational reliability and longevity.

The object is achieved by a method having the features of claim 1. According to the method according to the invention, a maximum permissible limit temperature of the electric drive and/or of the axle is first determined. The maximum permissible limit temperature depends in particular on the components, materials, and operating materials used, and does not depend on the operating state of the axle system. The limit temperature can thus be referred to as an inherent axle property. The axle system can be operated permanently at the maximum permissible operating temperature without the occurrence of excessive thermally-induced wear or thermally-induced damage to the axle system. Thermally-induced wear or thermally-induced damage is to be expected only when the operating temperature is exceeded at a given time, or over a critical time period, over the maximum permissible limit temperature. According to the method according to the invention, the operating temperature of the electric drive and/or of the axle is further detected during operation. A maximum permissible limit speed and/or the maximum permissible limit acceleration of the at least one actuating element is then determined according to the maximum permissible limit temperature and the detected operating temperature of the electric drive and/or the axle.

The determination of a maximum permissible limit temperature and the detection of the operating temperature has the advantage that the present thermal state of the axle system is known. In this way, changing ambient conditions and installation situations can be compensated for, wherein the axle system adapts to the changes and/or is itself optimized. Consequently, the axle system is operable at the power optimum. Due to the determination of the maximum permissible limit temperature, it can also be prevented that the operating temperature exceeds the thermal load limit, in particular the maximum permissible limit temperature, either briefly or over a critical period of time. In addition, the need for a design of the axle system is dispensed with. It is merely necessary to determine a maximum permissible limit temperature of the electric drive and/or the axle.

It is preferably conceivable for the maximum permissible limit speed and/or the maximum permissible limit acceleration to be determined as a function of the temperature difference between the maximum permissible limit temperature and the detected operating temperature of the electric drive and/or the axle.

The operating temperature can be detected, for example, by a temperature sensor. It is also conceivable that, alternatively to or in addition to the speed and/or acceleration, the jerk of the actuating element can also be determined and adjusted.

It is conceivable that the axle system is operated further in such a way that the operating speed and/or the operating acceleration of the actuating element is reduced when the operating temperature is at or above the thermal load limit, in particular at or above the maximum permissible limit temperature. It is also conceivable that the operating speed and/or the operating acceleration and/or the operating jerk of the actuating element is increased if the operating temperature has a significant temperature difference from the thermal load limit, in particular from the maximum permissible limit temperature. It is also conceivable that the operating speed and/or the operating acceleration of the actuating element is kept constant if the operating temperature substantially corresponds to the thermal load limit, in particular the maximum permissible limit temperature.

The operating speed and/or the operating acceleration and/or the operating jerk and/or the activation of the electric drive is preferably adjusted as a function of the maximum permissible limit temperature and the detected operating temperature. It is advantageous if the operating speed and/or the operating acceleration and/or the operating jerk corresponds as often as possible, and/or for as long as possible, to the limit speed and/or the limit acceleration and/or the limit jerk, or is in the range of the limit speed and/or the limit acceleration and/or the limit jerk. The axle system can thus be operated as often as possible and/or as long as possible at the power optimum. Accordingly, reduced cycle times can be achieved, among other things, by compensating for the installation situation or the ambient conditions, wherein the operating speed can be adjusted as a function of the ambient conditions and/or the installation situation. Furthermore, the cycle time can adapt itself to different products, so that all drives and axles are always operated at the power optimum. In addition, downtimes can be made up for by maintenance and/or product feeds, which lead to cooling of the drives and/or of the axle. When the axle system is restarted, the axle system can be operated with increased acceleration and/or at increased speed and/or with increased jerk. In addition, the axle system, in particular the operating and/or limit speed and/or operating and/or limit acceleration and/or operating and/or limit jerk, adapts independently to changing ambient conditions, wherein higher temperatures do not lead to a halt, but rather only to a reduction in power, and wherein lower temperatures, which can be deliberately brought about by air conditioning, for example, lead to an increase in power.

It is advantageous if the operating speed and/or the operating acceleration of the at least one actuating element is adjusted in such a way that the operating speed and/or the operating acceleration always lies in the range of the limit speed and/or the limit acceleration in the ideal case, and/or that the operating temperature always lies in the range of the limit temperature in the ideal case, wherein the range of the limit speed and/or the limit acceleration corresponds in each case to a deviation of +−10%, in particular of +−5% and preferably of +−3%. Consequently, the axle system always strives for the power optimum which is advantageous for the cycle time.

It is conceivable that the limit temperature preferably corresponds to the thermal load limit of the axle system. The range of the limit temperature preferably deviates from the limit temperature approximately by 20%, in particular 10%, and preferably 5%. The range of the limit temperature further or alternatively preferably deviates by approximately 10° ° C., in particular by 5° C., and preferably by 2° C. from the limit temperature.

An advantageous development provides that the operating temperature of the electric drive and/or of the axle is measured in—in particular, defined and/or configurable—measuring intervals of less than 60 s, in particular of less than 30 s, preferably of less than 10 s, preferably of less than 2 s, and more preferably of less than 1 s, or continuously. It is conceivable that the operating temperature is detected in real time. It is also conceivable that the operating speed and/or acceleration and/or jerk is adjusted in real time. It is advantageous if the limit temperature and/or the range of the limit temperature and/or the magnitude of the deviation from the limit temperature can be adjusted. If, by way of example, production must be accelerated, the axle system can be operated above the thermal load limit at which the risk of premature thermal wear or premature thermal damage of the axle system is accepted. For this purpose, the limit temperature can be increased manually, for example.

Advantageously, the operating speed and/or operating acceleration and/or operating jerk of the at least one actuating element are adjusted by adjusting the electrical current of the electric drive. The electrical current is preferably adjusted as a function of the maximum permissible limit temperature and the detected operating temperature. To increase the operating speed and/or operating acceleration and/or operating jerk, the current delivery to the electric drive can be increased. To reduce the operating speed and/or operating acceleration and/or operating jerk, the current delivery to the electric drive can be reduced.

It is advantageous if the operating speed and/or operating acceleration and/or operating jerk of the at least one actuating element are adjusted in such a way that the operating temperature does not exceed the limit temperature or does not exceed it for a critical period of time. It is conceivable for the limit temperature and/or the range of the limit temperature to be exceeded at most for a critical period, in particular of 60 s, preferably of 30 s and very preferably of 10 s. Accordingly, this prevents considerable thermal damage from occurring in the axle system.

Advantageously, furthermore or alternatively, the adjustment of the operating speed and/or the operating acceleration and/or the operating jerk of the actuating element takes place according to the coming travel paths and/or the coming pause times and/or the coming ambient conditions, such as ambient temperature or changing attachment parts, of the axle system. If the subsequent travel paths are significantly slower or a pause time is provided, wherein the operating temperature would cool down, the actuating element can be operated in the previous times at an increased operating speed and/or operating acceleration and/or operating jerk which leads to exceeding the thermal load limit, in particular the limit temperature. Due to the subsequent cooling phases for slow primary and/or secondary operating times, or a stoppage time, thermal damage to the axle system is nevertheless not to be expected. The same also applies to ambient temperatures which cool or increase, for example in winter or at night, or to changing attachment conditions in the axle system with increased or reduced heat dissipation. Accordingly, the axle system can already be operated before the occurrence of a change in state with an increased or reduced operating speed and/or operating acceleration and/or operating jerk in order to ensure optimal operation.

It is also advantageous if the adjustment of the operating speed and/or the operating acceleration of the actuating element takes place in such a way that the operating speed and/or the operating acceleration lies in the range of, or above, the limit speed and/or the limit acceleration, in order to warm up the electric drive and/or the axle. If the electric drive and/or the axle has an operating temperature which is too low, the axle system can be heated up by adjusting the operating speed and/or the operating acceleration above the limit speed and/or the limit acceleration until a suitable operating temperature is reached.

Furthermore, it is conceivable that the state, in particular the wear and/or the maintenance state, of the axle system, in particular the electric drive and/or the axle, is determined as a function of the maximum permissible limit temperature and the operating temperature. The number of excessively-high states and the duration of the operating temperature above the limit temperature can be detected in this case. Furthermore, higher temperature differences can be classified higher, e.g., by means of a point system. On the basis of this, it is possible to infer the wear state, necessary maintenance, and the service life of the axle system. The more points there are for an axle system, in particular an electric drive and/or an axle, the more likely a wear, damage or failure is to be expected. Accordingly, the exceeding of the limit speed and/or the limit acceleration and/or the limit jerk can alternatively also be used.

It is also advantageous if the at least one electric drive and/or the at least one axle is cooled by means of a cooling device. Advantageously, the electric drive and/or the axle is then cooled as soon as the operating temperature reaches a cooling temperature. The cooling temperature is advantageously adjustable. The cooling temperature can correspond to the limit temperature or lie below or above the limit temperature. The object achieved by the invention is likewise solved by an axle system having the features of claim 11. The axle system is provided in particular for a blank separator. The axle system comprises at least one axle, at least one actuating element which can be displaced along the axle, wherein the actuating element has an operating speed and/or an operating acceleration during operation. The actuating element can preferably be displaced in one or two or three spatial directions. In addition, the actuating element is preferably rotatable about one or two or three spatial directions. The axle system comprises at least one electric drive for moving the at least one actuating element, wherein the electric drive and/or the axle has an operating temperature during operation. Furthermore, the axle system has a drive controller for controlling the at least one electric drive, wherein the drive controller controls in particular the operating speed and/or the operating acceleration of the actuating element. In addition, the axle system has at least one temperature sensor for detecting the operating temperature of the at least one electric drive and/or the at least one axle.

The drive controller has a memory for storing a maximum permissible limit temperature. Furthermore, the drive controller is configured to determine a maximum permissible limit speed and/or a maximum permissible limit acceleration of the actuating element as a function of the maximum permissible limit temperature and the operating temperature of the electric drive and/or the axle detected by the temperature sensor. Accordingly, the axle system can be operated without a design at the power optimum. In addition, the axle system adapts independently to changing ambient and/or installation conditions.

It is advantageous if the drive controller is configured to carry out a method having the features of claims 1 to 10. By means of the configuration of the drive controller according to the invention, it can be ensured that the axle system is always operated optimally, in particular with regard to the thermal load limit of the axle system.

An advantageous development provides that the drive controller is configured to adjust the operating speed and/or operating acceleration of the actuating element as a function of the maximum permissible limit speed and/or limit acceleration of the actuating element. Accordingly, the axle system can be operated as often as possible or as long as possible at the power optimum.

It is also advantageous if the electric drive has at least one winding and/or at least one permanent magnet, and if the at least one temperature sensor is arranged on the winding and/or on the permanent magnet. Furthermore, it is advantageous if the at least one temperature sensor detects the operating temperature at the winding and/or on the permanent magnet.

Another advantageous development provides that the axle system has a cooling device for cooling the at least one electric drive and/or the at least one axle. Accordingly, it can be ensured that a suitable operating temperature is present even at a high operating speed and/or high operating acceleration of the actuating element.

It is also advantageous if the drive controller is configured to control the cooling device in such a way that the electric drive and/or the axle is cooled by the cooling device when the operating temperature reaches a cooling temperature. Accordingly, a targeted cooling can take place.

This object is likewise achieved by a computer program. Accordingly, the computer program comprises commands which, when the program is executed by a computer, cause the computer to execute the steps of the methods disclosed herein.

Furthermore, the object is achieved by a computer-readable storage medium on which the computer program is stored.

In addition, the object is achieved by a data carrier signal which transmits the computer program.

Further details of the invention can be found in the following description, on the basis of which an embodiment of the invention is described and explained in more detail.

IN THE DRAWINGS

Figure 1:
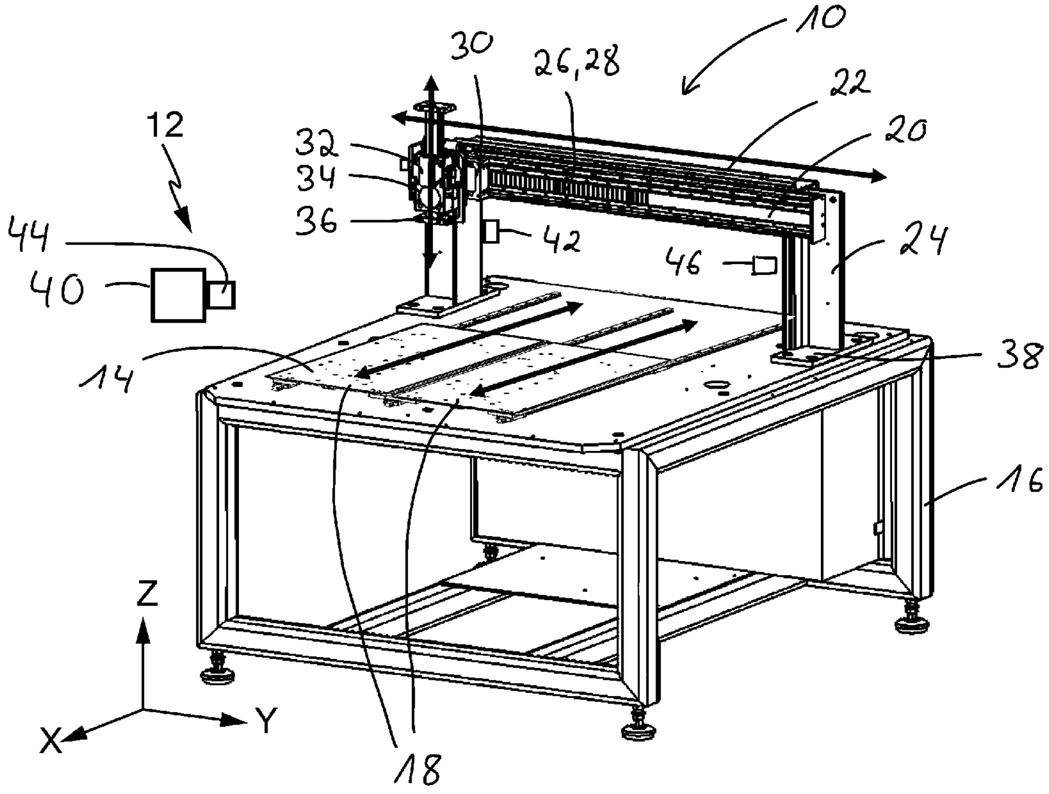
FIG. 1 is an axle system according to the invention with a drive controller, a temperature sensor, and a cooling device.

FIG. 1 is an axle system 10 according to the invention for a blank separator 12. The blank separator 12 serves to separate individual printed circuit boards from a printed circuit board blank 14. The blank separator 12 comprises a frame 16 and two loading bays 18. A Cartesian coordinate system with an X, Y and Z axes is shown in order to assign the directions.

The axle system 10 comprises a first axle 20 extending along the Y-axis, wherein the first axle 20 has a first electric drive 26 designed as a linear direct drive arranged on a cross-member 22 of a gantry 24. Furthermore, the first axle 20 has a guide 28 and a first actuating element 30 with a guide carriage. In addition, the axle system 10 comprises a second axle 32 extending along the Z-axis, wherein the second axle 32 comprises a second electric drive 34 designed as an axle drive. The second axle 32 can be displaced along the Y-axis by means of the linear direct drive 26. A second actuating element 36 in the form of a cutting tool arranged on a carriage is provided on the second axle 32. The second actuating element 36 can be moved along the Z-axis by means of the axle drive 34. In the embodiment according to FIG. 1, the third axle 38 is arranged fixedly and non-movably on the frame 16. However, it is also advantageous if the third axle 38 is constructed in accordance with the first and second axles 20, 32, in particular arranged movably on the frame 16. It is conceivable that the axle system 10 furthermore has a third axle 38 extending along the X-axis, wherein the third axle 38 has a third drive for moving a third actuating element 24 designed as a gantry.

The axle system 10 has a drive controller 40 for controlling the drives 26, 34. In operation, the actuating elements 24, 30, 36 each have an operating speed $v_B$ at their corresponding movement position, and/or each have an operating acceleration $a_B$. In operation, the drives 26, 34 and the axles 20, 32, 38 each have an operating temperature $T_B$ which, among other things, is established by the drive and movement of the actuating elements 24, 30, 36.

To adjust an operating speed $v_B$ and/or an operating acceleration as, the drive controller 40 transmits an output signal to the electric drives 26, 34, so that the electric drives 26, 34 are energized with a current corresponding to the operating speed $v_B$ and/or the operating acceleration $a_B$.

A temperature sensor 42 for detecting the operating temperature $T_B$ of the drives 26, 34 and of the axles 20, 32, 36 is arranged on each drive 26, 34 and axle 20, 32, 36, wherein the operating temperature $T_B$ of the drives 26, 34 and the axles 20, 32, 36 is continuously measured. Only one temperature sensor 42 is shown in FIG. 1 for the sake of clarity. The drives 26, 34 each have at least one winding (not shown) and at least one permanent magnet (not shown), wherein the corresponding temperature sensor 42 detects the given operating temperature $T_B$ on the winding and/or on the permanent magnet.

The movement and the regulation of the axle system 10 are described below with reference to the first axle 20. The second axle 32 is constructed corresponding to the first axle 20 and the third axle 36 can also be constructed corresponding to the first axle 20. For this purpose, reference is made to the profile diagram according to FIG. 2, wherein an exemplary movement of the first actuating element 20 and the operating temperature of the first drive 26 are shown.

Figure 2:
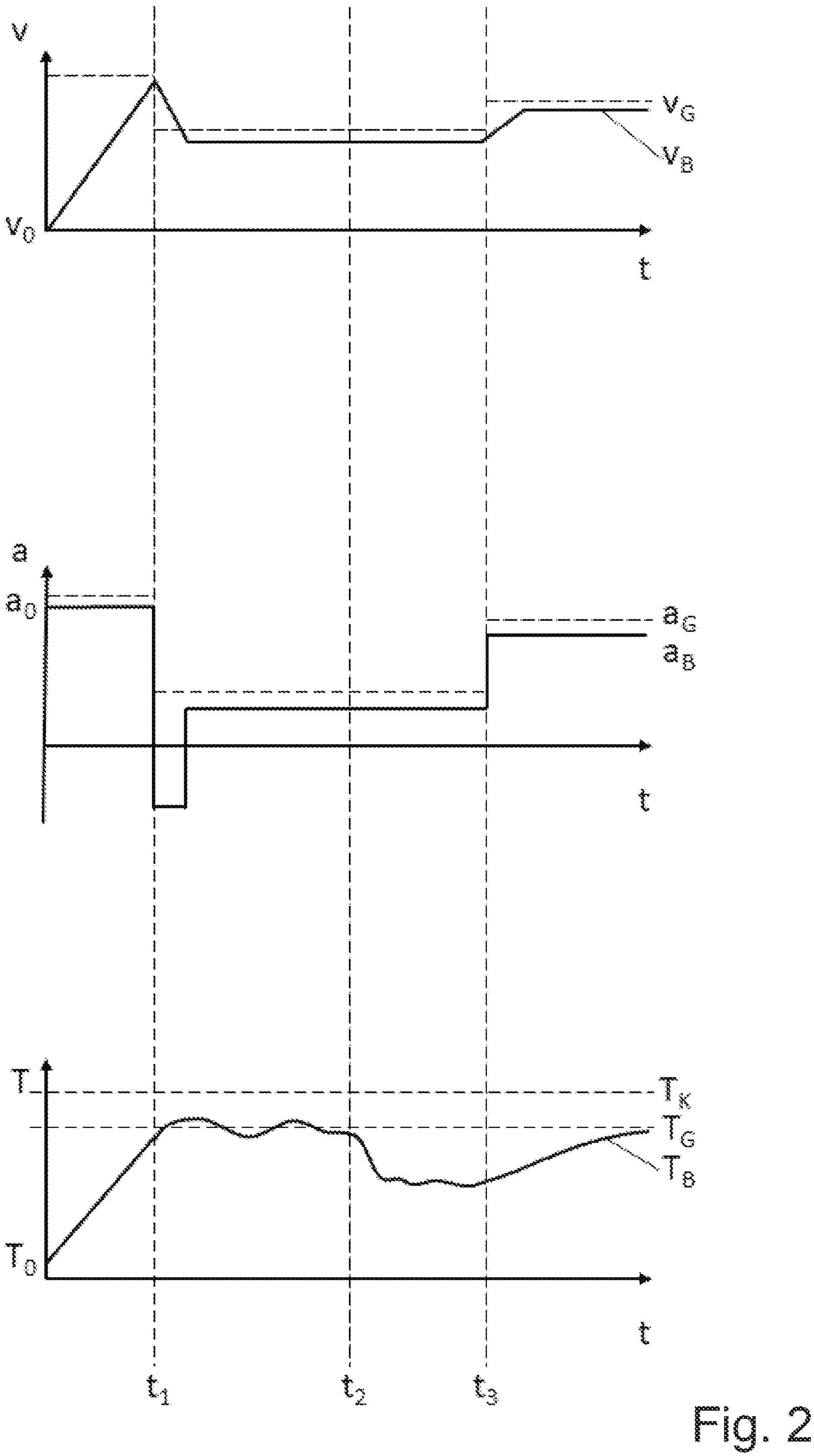
FIG. 2 is a profile diagram of the movement speed and movement acceleration of a first actuating element, as well as the operating temperature of a first drive.

In the profile diagram according to FIG. 2, the speed v, the acceleration a, and the temperature T are each plotted as a function of time t. At the start, the first actuating element 30 is in an initial position, wherein the first drive 26 has an initial temperature $T_0$ in the range of the ambient temperature. The drive controller 40 has a memory 44 for storing a limit temperature $T_G$; this can be predefined at the factory or can be set by the user. The limit temperature $T_G$ represents the maximum permissible operating temperature $T_B$ at which the first drive 26 can be operated in continuous operation.

To move the actuating element 30, the first drive 26 is energized by means of a drive signal of the drive controller 40, wherein an initial acceleration $a_0$ of the actuating element 30 occurs. The speed $v_B$ of the actuating element 30 increases accordingly. By energizing the first drive 26, the operating temperature $T_B$ rises and approaches the limit temperature $T_G$. At time $t_1$, the operating temperature $T_B$ is in the range of the limit temperature $T_G$ of the first drive 26, wherein the range is formed, in particular, by a positive and negative deviation of 5% around the limit temperature $T_G$. The drive controller 40 registers the reaching of the range of the limit temperature $T_G$ and therefore regulates the first drive 26, so that a lower energization of the first drive 26 and a lower operating acceleration as of the actuating element 30 occur.

Based on the temperature difference between the operating temperature $T_B$ and the limit temperature $T_G$, the drive controller 40 determines a maximum permissible limit speed $v_G$ and a maximum permissible limit acceleration ac, wherein these corresponds to an equivalent drive current of the first drive 26. By increasing the operating acceleration as, the operating temperature $T_B$ approaches the limit temperature $T_G$, so that the temperature difference becomes smaller. Due to the lower temperature difference, the drive controller 40 determines a lower limit speed $v_G$ and/or a lower limit acceleration as for the actuating element 30.

By lowering the limit speed $v_G$ and the limit acceleration $a_G$, the actuating element 30 has a maximum operating speed $v_B$ in the range of the limit speed $v_G$ and an operating acceleration $a_B$ in the range of the limit acceleration ac so that the operating temperature $T_B$ of the first drive 26 does not exceed the limit temperature $T_G$. The drive controller 40 determines the limit speed $v_G$ and the limit acceleration as in such a way that at a constant operating speed $v_B$ and/or a constant operating acceleration as in the range of the limit speed $v_G$ and/or the limit acceleration $a_G$, there is also a constant operating temperature $T_B$ in the range of the limit temperature $T_G$. The first drive 26 can thus be operated at the power optimum and the cycle time of the axle system 10 can be reduced. It is immaterial in this whether the actuating element 30 is accelerated, as before the time $t_1$, or the actuating element 30 is decelerated and/or braked, as immediately after the time $t_1$. The first drive 26 is operated at the power optimum when the operating temperature $T_B$ is in the range of the limit temperature $T_G$.

At time $t_2$, the ambient conditions change because the ambient temperature drops due to operation of an air conditioning system. The consequence of this is that, despite a constant operating acceleration $a_B$ of the actuating element 30 and/or a constant energization of the first drive 26, the operating temperature $T_B$ of the first drive 26 drops. The drive controller 40 registers the temperature difference between the operating temperature $T_B$ and the limit temperature $T_G$ between the times $t_2$ and $t_3$. Due to the higher temperature difference, the first drive 26 can be operated with increased power. Consequently, the drive controller 40 determines a higher limit speed $v_G$ and a higher limit acceleration $a_T$ according to the temperature difference. Consequently, the operating speed $v_B$ and operating acceleration as can be increased and the cycle time can be additionally optimized. As a result, the operating temperature $T_B$ increases again up to the range of the limit temperature $T_G$. Thus, the drive controller 40 can independently optimize the cycle time by optimizing the limit speed $v_G$ and/or the limit acceleration as, and also respond to changing ambient conditions and installation situations. A complex design is not required for this purpose.

Should the ambient temperature increase, the operating temperature $T_B$ would significantly exceed the limit temperature $T_G$, given constant parameters. In this case, the drive controller 40 down-regulates the limit speed $v_G$ and/or the limit acceleration as, so that the operating temperature $T_B$ is again in the optimal range.

For cooling the electric drives 26, 34 and/or the axles 20, 32, the axle system 10 has a cooling device 46. The drive controller 38 is furthermore configured to control the cooling device 46 in such a way that the electric drives 26, 34 and the axles 20, 32 are cooled by the cooling device 46 when the operating temperature $T_B$ reaches or exceeds a cooling temperature $T_K$.

Figure 3:
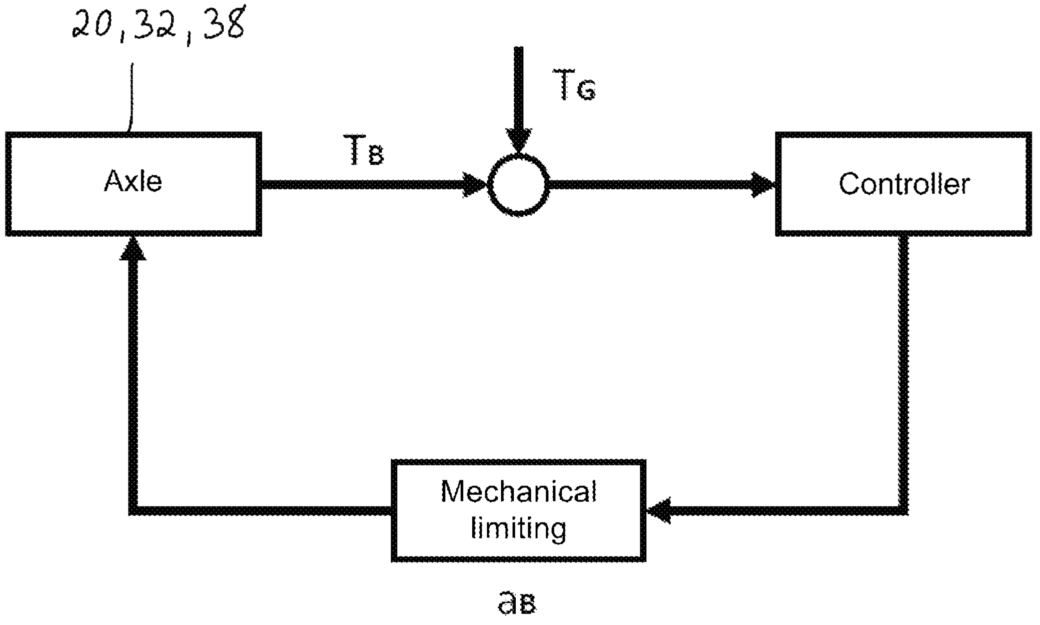
FIG. 3 is a schematic illustration of a control loop.

FIG. 3 is the control loop of the drive controller 40, wherein a separate control loop according to FIG. 2 can be provided for each electric drive 26, 34 and/or axle 20, 32, 36. The control loop shows the regulation of the electric drives 26, 34 and/or of the axles 20, 32, 36 with regard to the operating speed $v_B$ and/or the operating acceleration $a_B$ of the actuating element 30, 36 as a function of the maximum permissible limit temperature $T_G$ and the detected operating temperature $T_B$.

The invention claimed is:

1. A method for operating an axis system for a blank separator, wherein the axis system comprises:

at least one axis;

at least one actuating element that can be moved linearly along the at least one axis; and at least one electric drive for moving the at least one actuating element;

wherein, during operation, the at least one actuating element has an operating speed and/or an operating acceleration, and wherein the at least one electric drive and/or the at least one axis have an operating temperature during operation, wherein the method includes:

determining a maximum permissible limit temperature of the at least one electric drive and/or the at least one axis, detecting the operating temperature of the at least one electric drive and/or the at least one axis, determining a maximum permissible limit speed and/or limit acceleration of the at least one actuating element as a function of the maximum permissible limit temperature and the detected operating temperature of the at least one electric drive and/or of the at least one axis, and adjusting the operating speed and/or the operating acceleration of the at least one actuating element as a function of the maximum permissible limit speed and/or the maximum permissible limit acceleration of the at least one actuating element.

2. The method according to claim 1, further comprising: adjusting the operating speed and/or the operating acceleration of the at least one actuating element in such a way that the operating speed and/or the operating acceleration is/are in the range of the maximum permissible limit speed and/or limit acceleration of the at least one actuating element, and/or the operating temperature is in the range of the limit temperature.

3. The method according to claim 1, wherein the operating temperature of the at least one electric drive and/or the at least one axis is measured in measurement intervals of less than 60 s.

4. The method according to claim 1, wherein the adjustment of the operating speed and/or operating acceleration of the at least one actuating element takes place by adjusting the electrical current at the at least one electric drive.

5. The method according to claim 1, wherein the adjustment of the operating speed and/or operating acceleration takes place such that the operating temperature does not exceed the limit temperature, or does not exceed it for longer than a critical time period.

6. The method according to claim 1, wherein the adjustment of the operating speed and/or operating acceleration of the at least one actuating element takes place according to the coming movement paths and/or the coming downtimes and/or the coming ambient conditions, in particular ambient temperature and/or the changing of attachment parts, of the axis system.

7. The method according to claim 1, wherein the adjustment of the operating speed and/or operating acceleration of the at least one actuating element takes place in such a way that the operating speed and/or operating acceleration is/are in the range of, and/or above, the limit speed and/or limit acceleration, to heat the at least one electric drive and/or the at least one axis.

8. The method according to claim 1, wherein the state of the axis system, in particular the wear and/or maintenance state, is determined according to the maximum permissible limit temperature and the operating temperature, wherein an exceeding of the operating temperature above the limit temperature is classified, in particular with regard to duration and/or temperature difference.

9. The method according to claim 1, wherein the at least one electric drive and/or the at least one axis is/are cooled by a cooling device when the operating temperature reaches a cooling temperature.

10. An axis system for a blank separator, the axis system comprising:

at least one axis;

at least one actuating element that can be moved linearly along the at least one axis, wherein during operation the at least one actuating element has an operating speed and/or an operating acceleration;

at least one electric drive for moving the at least one actuating element, wherein during operation the at least one electric drive and/or the at least one axis axle has/have an operating temperature;

a drive controller for controlling the at least one electric drive; and at least one temperature sensor for detecting the operating temperature of the at least one electric drive and/or the at least one axis;

wherein the drive controller has a memory for storing a maximum permissible limit temperature, and wherein the drive controller is configured to determine a maximum permissible limit speed and/or limit acceleration of the at least one actuating element as a function of the maximum permissible limit temperature and the detected operating temperature of the at least one electric drive and/or of the at least one axis, and to adjust the operating speed and/or the operating acceleration of the at least one actuating element as a function of the maximum permissible limit speed and/or the maximum permissible limit acceleration of the at least one actuating element.

11. The axis system according to claim 10, wherein the at least one electric drive has at least one winding and at least one permanent magnet;

wherein the temperature sensor is arranged on the winding and/or on the permanent magnet, and wherein the temperature sensor detects the operating temperature of the at least one winding and/or the at least one permanent magnet.

12. The axis system according to claim 10, further comprising a cooling device for cooling the at least one electric drive and/or the at least one axis.

13. The axis system according to claim 12, wherein the drive controller is configured to control the cooling device in such a way that the at least one electric drive and/or the at least one axis is/are cooled by the cooling device when the operating temperature reaches a cooling temperature.

14. A non-transitory computer-readable storage medium on which a computer program is stored, which comprises commands which, when the program is executed by a computer, cause the computer to execute the method according to claim 1.

* * * * *